(12) United States Patent
Chen et al.

(10) Patent No.: US 8,805,870 B2
(45) Date of Patent: Aug. 12, 2014

(54) MULTI-INPUT, MULTI-OUTPUT-PER-INPUT USER-DEFINED-FUNCTION-BASED DATABASE OPERATIONS

(75) Inventors: Qiming Chen, Cupertino, CA (US); Meichun Hsu, Los Altos Hills, CA (US); Bin Zhang, Fremont, CA (US); Ren Wu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 72 days.

(21) Appl. No.: 13/192,373

(22) Filed: Jul. 27, 2011

(65) Prior Publication Data

US 2013/0031139 A1    Jan. 31, 2013

(51) Int. Cl.
*G06F 17/30*    (2006.01)

(52) U.S. Cl.
USPC ........... 707/769; 707/773; 707/774; 707/775; 707/802

(58) Field of Classification Search
None
See application file for complete search history.

(56) References Cited

U.S. PATENT DOCUMENTS

| | | | |
|---|---|---|---|
| 6,614,893 B1 | 9/2003 | Paiz | |
| 7,103,590 B1 * | 9/2006 | Murthy et al. | 1/1 |
| 7,496,185 B1 | 2/2009 | Primavesi et al. | |
| 2005/0138160 A1 | 6/2005 | Klein et al. | |
| 2005/0281399 A1 * | 12/2005 | Moisey et al. | 379/126 |
| 2006/0045251 A1 | 3/2006 | Liu et al. | |
| 2006/0229931 A1 | 10/2006 | Fligler et al. | |
| 2009/0077019 A1 * | 3/2009 | Todd | 707/2 |
| 2012/0005190 A1 * | 1/2012 | Faerber et al. | 707/718 |

OTHER PUBLICATIONS

Author: Princeton University, Title "Memory Allocation—CS 217", Date:Sep. 19, 2006, Publisher: http://web.archive.org, Pertinent pp. 1-7.*

* cited by examiner

*Primary Examiner* — Anh Tai Tran

(57) ABSTRACT

The current application discloses a database management system that provides multiple-input, multiple-output-per-input user-defined-function-based operations. The database management system comprises at least one processor and electronic memory, a database-query processor, executed on a computer processor controlled by computer instructions stored in a computer-readable memory, that makes multiple calls to a multiple-input, multiple-output-per-input user-defined-function, in each call transmitting a next input to the multiple-input, multiple-output-per-input user-defined-function, and the multiple-input, multiple-output-per-input user-defined-function, executed on a computer processor controlled by computer instructions stored in a computer-readable memory, that uses three different memory buffers, the contents of which are maintained for three different time periods, to compute and return to the database-query processor multiple outputs in response to at least one of the multiple inputs.

20 Claims, 13 Drawing Sheets

|     | CID  | A   | B   |
| --- | ---- | --- | --- |
|     | A032 | 36  | 761 |
|     | A623 | 13  | 83  |
|     | B121 | 122 | 942 |
|     | B860 | 122 | 81  |
|     | B991 | 43  | 209 |
|     | C004 | 75  | 10  |
|     | C128 | 86  | 618 |
|     | C347 | 137 | 14  |
|     | C446 | 54  | 14  |
|     | D019 | 32  | 14  |

DATA

FIG. 1A

| CID  | NAME     |
| ---- | -------- |
| A032 | Brown    |
| A623 | Anderson |
| B121 | Phillips |
| B860 | Smith    |
| B991 | White    |
| C004 | Black    |
| C128 | Thompson |
| C347 | Martin   |
| C446 | Nelson   |
| D019 | Johnson  |

CUSTOMERS

FIG. 1B

```
CREAT FUNCTION SUM_AND_MAX                          ⎯ 202
( @VAL1 INTEGER @ VAL2 INTEGER @ MAX INTEGER)
RETURNS INTEGER
                        ⎯ 204
AS
BEGIN
     SET @VAL1 = @VAL1 + @VAL2
     IF @VAL1 > MAX
         SET @VAL1 = MAX
     RETURN @VAL1
END
```

FIG. 2

```
CREATE TABLE GOOD       ⟋— 302
(NAME VARCHAR(30),
 AMOUNT INTEGER)
                                        ⟋— 306
INSERT INTO GOOD (NAME, AMOUNT)⟋                    ⟋— 304
SELECT C.NAME, SUM_AND_MAX(D.A, D.B, 500)
FROM C.CUSTOMERS, D.DATA                            ⟋— 308
WHERE C.CID = D.DID AND (D.A>200 OR D.B>200)
```

FIG. 3A

| NAME | AMOUNT |
|---|---|
| Brown | 500 |
| Phillips | 500 |
| White | 252 |
| Thompson | 500 |

GOOD

FIG. 3B

```
CREATE FUNCTION GOOD
(@MAXINTEGER)

RETURNS @GOOD TABLE (NAME VARCHAR(30), AMOUNT INTEGER)
AS
BEGIN
     INSERT INTO @GOOD(NAME, AMOUNT)
     SELECT C.NAME, MIN(D.A. + D.B, MAX)
     FROM C.CUSTOMERS, D.DATA
     WHERE C.CID = D.DID AND (D.A > 200 OR D.B > 200)
     RETURN
END

SELECT * FROM GOOD (500)
```

FIG. 5

| CID1 | CID2 | T |
|---|---|---|
| B860 | B121 | * |
| C446 | C347 | * |
| D019 | C347 | ** |
| D019 | C446 | ** |

CORRESPONDERS

FIG. 7

MULTI-INPUT, MULTI-OUTPUT-PER-INPUT USER-DEFINED-FUNCTION-BASED DATABASE OPERATIONS

TECHNICAL FIELD

The present invention is related to database operations and, in particular, to a system and method that provides multi-input, multi-output-per-input user-defined-function-based database operations.

BACKGROUND

The rapid evolution and advancement of computers and computer-based technologies, beginning with the early vacuum-tube-based computers of the 1940s and 1950s and progressing to vast parallel-processing, distributed computer systems interconnected to vast electronic data-storage facilities and world-spanning electronic communications media, has spawned a large number of complex technical and scientific fields within the computational domain. As one example, the field of database management systems emerged in the 1960s to play an increasingly large role in academic and commercial computing. As hardware data-storage devices evolved to provide rapidly increasing data-storage capacities and data-transfer bandwidths, and as computer processing bandwidths increased at similar rates, systems and techniques for systematic and structured organization of, and access to, stored data were developed to facilitate implementation of data-related computational tasks. Early indexed-file-based and record-based database systems with relatively primitive access interfaces were gradually replaced with database management systems providing sophisticated algebraic data models and algebra-based query languages, automated backup and redundancy, and a rich assortment of database-related facilities and capabilities, including automated report generation.

Relational database management systems, which generally provide structured-query-language ("SQL") interfaces, have been the dominant type of database-management-system ("DBMS") for the past three decades. The SQL query language and relational algebra provide the basis for creating and maintaining complex, well-structured databases and for developing and executing complex query-based methods for accessing, analyzing, and manipulating data stored within relational DBMSs. Queries expressed in SQL can be optimized by sophisticated query optimization components of database management systems. Relational database management systems generally store data in relational tables, each comprising multiple rows having multiple columns. The columns represent fields within relational-table rows corresponding to database records. SQL provides built-in functions and operations for defining relational tables, inserting data into relational tables, extracting data from relational tables, and for expressing complex queries that may span a vast number of rows and large numbers of different relational tables within a relational DBMS. Over the years, additional types of features and functions have been steadily added to the relational DBMS model and to the SQL language. For example, SQL has been enhanced to support large, unstructured-data fields, object-oriented features, user-defined stored procedures, and user-defined functions. User-defined functions ("UDFs") encapsulate one or more standard SQL statements in a function format, similar to functions in procedural languages, which can be called from standard SQL statements. Just like functions in procedural languages, user-defined functions in SQL and other DBMS query languages allow users to define useful collections of SQL statements in one operation and location, and to then invoke the encapsulated statements from within SQL statements via a simple function call. As with procedural-computer-language functions, user-defined functions in SQL and other DBMS query languages are constrained with regard to invocation patterns. While such constraints are used to render user-defined functions interpretable and/or compliable by automated query-language interpreters and/or compilers, invocation-pattern constraints may constrain the utility of user-defined functions for many applications and task domains to which users may wish to apply them. Designers, developers, vendors, and users of DBMSs and DBMS query languages continue to encounter task domains to which application of currently available types of user-defined functions is difficult or impractical, and therefore seek new approaches for addressing these task domains.

BRIEF DESCRIPTION OF THE DRAWINGS

FIGS. 1A-B show two relational tables that are used in subsequently described examples of user defined functions.

FIG. 2 shows the declaration of a simple scalar user-defined function.

FIG. 3A shows two SQL statements, the latter of which provides an example of use of the user-defined function SUM_AND_MAX, discussed above with reference to FIG. 2.

FIG. 3B shows the result of the two SQL statements shown in FIG. 3A applied to the relational tables DATA and CUSTOMERS shown in FIGS. 1A-B.

FIG. 5 illustrates a second type of user-defined function, referred to as a "table user-defined function."

FIG. 7 shows a result relational table CORRESPONDERS produced by a hypothetical database operation.

DETAILED DESCRIPTION

Figure 4:
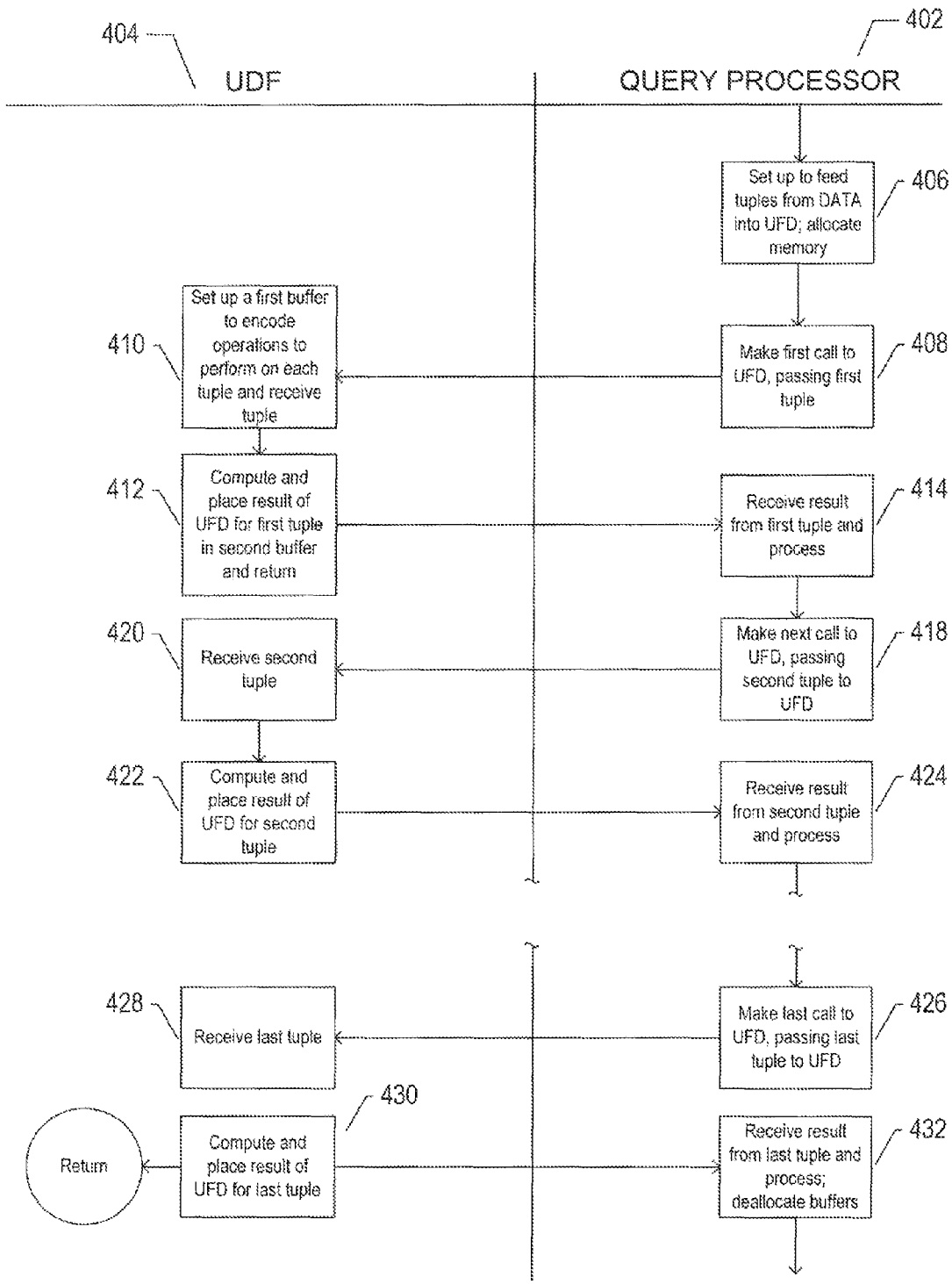
FIG. 4 illustrates one implementation of a scalar user-defined function, such as the scalar user-defined function SUM_AND_MAX discussed above with reference to FIG. 2.

The current application is directed to a new class of user-defined-function-based processor-controlled database operations within database management systems. The new class of user-defined-function-based database operations is specified by a new class of user-defined functions that feature invocation patterns that are not currently supported by SQL user-defined functions ("UDFs") and currently available DBMSs. The new class of UDFs provides a framework for specifying various types of database operations that cannot currently be specified in UFDs currently provided by DBMS query languages. In the following discussion, various types of currently available UDFs are first described, in order to provide a context for describing the new class of UDFs that represent embodiments of the present invention. A task domain to which currently available UDFs cannot be applied is described and shown to be addressable using the new class of UDFs that represent embodiments of the present invention.

FIGS. 1A-B show two relational tables that are used in subsequently described examples of user defined functions. The relational table DATA 102 shown in FIG. 1A includes three columns: (1) CID 104, which represents a customer-identifier field; (2) A 106, which represents a field that contains an amount of a first type of purchase made by the customer with customer-identifier CID; and (3) B 108, which represents a field that contains an amount of a second type of purchase made by the customer with customer identifier CID. Each row in the relational table DATA, such as row 110, represents the transactions carried out by a customer during a visit to a retail store. The relational table CUSTOMERS 120 shown in FIG. 1B contains rows having two fields, defined by a CID column 122 and a NAME column 124, that contain a customer identifier and the last name of the customer with customer identifier.

FIG. 2 shows the declaration of a simple scalar user-defined function. The UDF SUM_AND_MAX receives three integer arguments 202 and returns an integer value 204. The UDF SUM_AND_MAX adds the first two arguments val1 and val2 and either returns the sum of arguments val1 and val2, when the sum is less than the third integer argument max, or returns the third argument max when the sum of the first two arguments val1 and val2 is equal to or greater than max.

FIG. 3A shows two SQL statements, the latter of which provides an example of use of the user-defined function SUM_AND_MAX, discussed above with reference to FIG. 2. In the first SQL, statement 302, a relational table GOOD is created. The relational table GOOD has two columns: (1) NAME, the name of a customer; and (2) AMOUNT, an amount equal to either the sum of the two different types of purchases made by the customer during a visit to a retail store or $500, whichever is smaller. The second SQL statement 304 inserts entries into the relational table GOOD. In this second statement, entries are extracted from the relational table DATA, discussed above with reference to FIG. 1A, along with either the sum of purchase types or $500, whichever is smaller, obtained by calling the above-discussed UDF SUM_AND_MAX 306. Those entries from the relational table DATA in which at least one of the two purchase amounts exceeds $200 qualify as candidates for forming rows of table GOOD, as specified by the WHERE clause 308 at the end of the second SQL statement. FIG. 3B shows the result of the two SQL statements shown in FIG. 3A applied to the relational tables DATA and CUSTOMERS shown in FIGS. 1A-B. As can be seen in the result table GOOD 320, four of the customers represented by rows in the relational table DATA qualified for inclusion in the table GOOD as a result of having spent more than $200 on at least one of the two purchase types A and B.

Thus, just as a function in a procedural language like C++ or Java, a UDF in SQL allows a user to define an SQL-statement-based function that can be included in standard SQL statements, such as the SELECT substatement within SQL statement 304 in FIG. 3A. In the example shown in FIG. 3A, the UDF SUM_AND_MAX computes a value from two columns of the relational table data for each entry in the relational table data, and thus is used syntactically similarly to a column name of a relational table in the SELECT substatement. As can easily be imagined. UDFs provide great convenience and many advantages to SQL programmers. UDFs need be defined once, rather than repeating statements encapsulated in a UDF in many places within SQL statements. This greatly diminishes opportunities for error, simplifies SQL statements, and facilitates large SQL-based DBMS-interface development.

FIG. 4 illustrates one implementation of a scalar user-defined function, such as the scalar user-defined function SUM_AND_MAX discussed above with reference to FIG. 2. In FIG. 4 as in subsequent figures illustrating implementation of UDFs, steps carried out by a query processor, which processes SQL statements in which calls to UDFs are contained, are shown in a right column 402 of the figure. Steps carried out by the called UDF are shown in a left column 404 of the figure. Initially, the query processor is assumed to be processing an SQL statement that includes a call to the UDF. At a point in time at which the query processor prepares to invoke the UDF, represented by step 406, the query processor initializes internal mechanisms to transmit inputs, such as relational-table tuples, to the UDF and to receive a result value from the UDF. This may involve having encoded the UDF call into a tree-like description of a query plan, allocating handles with which to exchange information with the UDF, and other bookkeeping tasks. In the described implementation, these set-up tasks also involve allocation of two memory buffers used by the UDF for storing information, including storing relational-table tuples or other, inputs passed from the query processor to the UDF. In a first call to the UDF, carried out in step 408, the query processor passes a first input value, such as a relational-table tuple, to the UDF as well as indicating that a first call is being made, generally by calling a particular first-call entry point within the UDF. When the UDF is invoked, in a first step 410, the UDF sets up a first of the two memory buffers to include information used by the UDF over all subsequent calls made by the query processor to the UDF during the lifetime of the UDF invocation. In addition, the UDF receives the first input, such as a relational-table tuple, in the second memory buffer. As an example, returning to FIG. 3A, during the first call to the SUM_AND_MAX UDF, input value 500 would be stored in the first memory buffer, for use in processing all subsequent calls, as would any other information related to processing subsequently received inputs from the query processor. The UDF, in step 412, computes the first integer result from the first received input. In the case of the invoked SUM_AND_MAX UDF illustrated in second SQL statement shown in FIG. 3A, the first received input is the first row of the relational table DATA shown in FIG. 1A, which is the first row of the table for which the WHERE clause of the second SQL statement shown in FIG. 3A is satisfied. In this case, the return value is 500, which is returned by the UDF to the query processor in step 412. In step 414, the query processor receives this result and continues processing the SQL statement in which the call to the UDF is included, using this first result. Then, in step 418, when the query processor again is ready to furnish a next input to the UDF, the query processor makes a next call to the UDF which is received by the UDF in step 420. In step 422, the UDF computes a result for the input received in step 420 and returns the result to the query processor, which receives the result in step 424. The query processor generally calls a normal-processing entry point of the UDF for transmitting all inputs other than the first input and last input. Eventually, the query processor makes a final call to the UDF, in step 426, passing the last input via a call to a last-call entry point of the UDF. In step 428, the UDF receives the last tuple, computes a result value in step 430, and returns the last result to the query processor in step 430 before terminating. In step 432, the query processor receives the last result, deallocates the memory buffers, and deconfigures anything else configured by the query processor, in step 406, in order to interact with the UDF.

There are many different possible implementations for the query-processor and scalar UDF interactions discussed above with reference to FIG. 4. For example, in certain implementations, at least one of the memory buffers used by the UDF may be allocated by the UDF, rather than the query processor, and deallocated by the UDF prior to termination. Return values may be returned on a call stack of the scalar UDF, may be returned in one of the memory buffers, or may be returned by other means. However, the relatively high-level implementation shown in FIG. 4 is adequate to illustrate several basic features of a scalar UDF. First, the scalar UDF employs a first memory buffer to contain information used by the scalar UDF over a series of calls from the query processor, in each of which the query processor furnishes an additional input, generally a relational-table row, for processing by the UDF, and a second memory buffer that is used on a per-input basis, such as transmitting a next input from the query processor to the UDF. A scalar UDF is designed to be called multiple times, following initial invocation, in order to process multiple relational tuples generated by an encompassing SQL statement, such as the SELECT substatement within the second SQL statement shown in FIG. 3A. A scalar UDF returns a scalar value, such as the integer value returned by the scalar UDF SUM_AND_MAX, illustrated in FIG. 2, for each received input.

Figure 6:
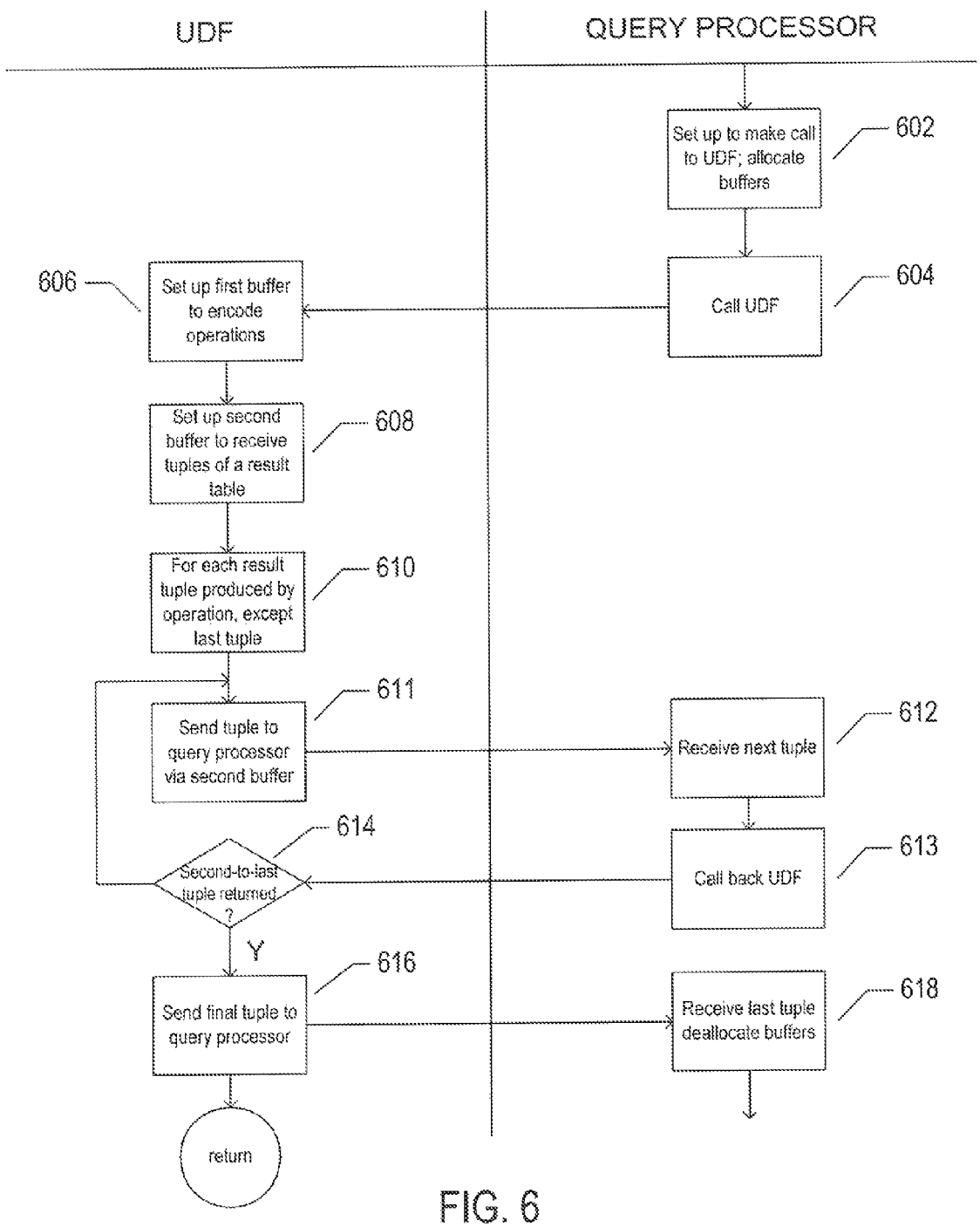
FIG. 6 provides a high-level illustration of one possible implementation of a table user-defined function, using the same illustration conventions as used in FIG. 4.

FIG. 5 illustrates a second type of user-defined function, referred to as a "table user-defined function." The table UDF is declared in a first SQL statement 502 in FIG. 5 and invoked in a second SQL statement 504 in FIG. 5. This table UDF generally returns the same relational table GOOD that is created by the CREATE TABLE and INSERT SQL statements 302 and 304 shown in FIG. 3A, although the table UDF GOOD returns rows one-by-one to the calling query processor. A call to the table UDF GOOD, in SQL statement 504, appears syntactically like selection from a relational table. The query processor calls a table UDF once, to initialize the UDF, and then repeatedly calls the UDF to receive result tuples. As with the scalar UDF, there are many ways to implement a table UDF and the query-processor support for calling table UDFs. FIG. 6 provides a high-level illustration of one possible implementation of a table user-defined function, using the same illustration conventions as used in FIG. 4. In step 602, the query processor has processed a SQL statement to the point that a cull to a table UDF is to be invoked. In step 602, the query processor sets up the framework for calling and receiving results from the table UDF, including allocating two memory buffers. Then, in step 604, the table UDF is called. The table UDF, in step 606, sets up a first of the two memory buffers to store information needed during processing of the table-UDF call, including during returning of one or more result tuples to the calling query processor. In step 608, the table UDF sets up a second of the two memory buffers for receiving result tuples and passing the result tuples back to the query processor. In the for-loop of steps 610-614, the UDF prepares all but the last result tuple, each result tuple being received by the query processor in step 612 in response to a call back to the UDF in step 613 to prepare for receiving a subsequent result tuple. In step 616, the table UDF prepares and sends a final result tuple to the query processor, which receives the final tuple in step 618 and then deallocates the memory buffers and deconfigures any additional framework configured in step 602 to prepare for interacting with the table UDF.

FIG. 6 illustrates basic features of a table UDF. First, unlike the scalar UDF, the table UDF is called with a single input, one time, and returns generally multiple outputs to the query processor, with the query processor repeatedly calling the table UDF to receive the multiple outputs, one output per call. UDF execution is associated with two memory buffers, just as scalar UDF execution is associated with two memory buffers. However, unlike the case of a scalar UDF, the table UDF employs one memory buffer to contain information used to process a single input, and uses another memory buffer on a per-output basis. While a scalar UDF can be repeatedly called to process each of multiple inputs, and therefore employs a memory buffer that spans multiple calls, each associated with a different input, a table UDF uses a memory buffer that spans a single input-transferring call.

Consider next another type of operation that a database administrator or SQL programmer may wish to undertake with respect to relational tables DATA and CUSTOMERS shown in FIGS. 1A-1B. In this hypothetical example, a developer may wish to consider each successive set of three rows within the relational table DATA in each of a sufficient number of iterations to consider all possible sets of three successive tuples within relational table DATA. In this example, the rows are assumed to be meaningfully ordered, such as with respect to time of customer entry into the retail establishment. In each iteration, the SQL program is implemented to compare values for fields A and B of the last-received tuple with the values of fields A and B of the two preceding tuples. When the last-received tuple has the same value for field A or field B as in a corresponding field of both of the two preceding tuples, then a double-starred (described below) result is produced for each of the preceding tuples. Otherwise, when either of the values of the last-received-tuple fields A and B is equal to the value of fields A or B in one of the preceding two tuples, a single-starred result tuple is produced. FIG. 7 shows a result relational table CORRESPONDERS produced by the hypothetical database operation. The first triplet of rows considered in the relational table DATA are the first three rows of the table. Because there are no shared values in the A and B columns for these three rows, no result tuple is produced for this first triplet of rows. Then, the next triplet comprising rows 130-132 is considered. In this case, the final row of the triplet 130 and a previous row 131 both contain the value 122 for field A. Therefore, a single-starred result tuple 702 is produced and inserted into relational table CORRESPONDERS 700 shown in FIG. 7. Additional triplets are considered by the operation, but produce no result tuples, until the triplet comprising rows 133-136 in relational table DATA is considered. In this case, the final row 133 of the triplet and the previous row 134 both contain the value 14 in field B. However, these are the two rows of the triplet that share a common value. Therefore single-starred result 704 is produced and inserted into the table CORRESPONDERS. Then, a final triplet including rows 138 and 133-134 of relational table DATA is considered. In this case, all three rows of the triplet have the same value 14 in field B. As a result, two double-starred result tuples are produced and entered into the CORRESPONDERS table 706 and 705. Result tuple 705 indicates that relational table DATA rows 138 and 134 share the same value in one of fields A and B and result tuple 706 indicates that relational table DATA rows 138 and 133 share a common value in either or both of fields A and B. Because two result tuples are produced for the last-considered considered triplet of rows in relational data DATA, these two result topics are double starred.

Figure 8:
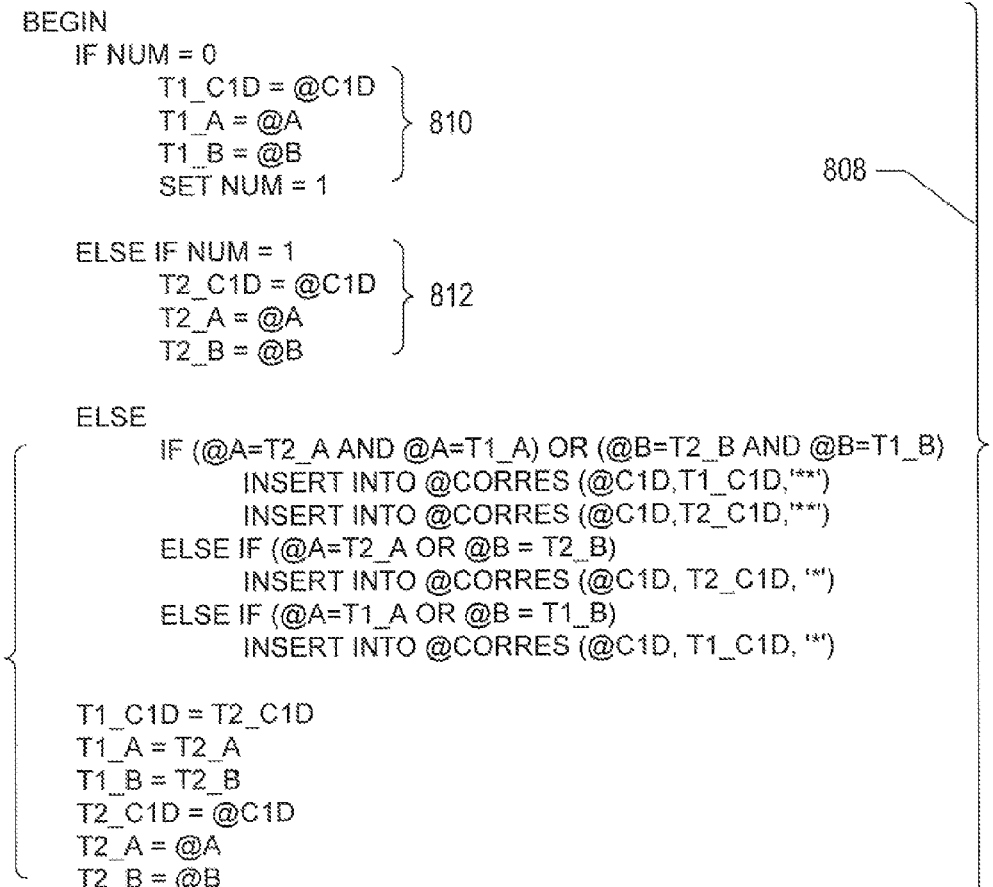
FIG. 8 illustrates a multiple-input, multiple-output-per-input user-defined function that represents one embodiment of the present invention, which produces the tuples shown in the CORRESPONDERS relational table shown in FIG. 7.

FIG. 8 illustrates a multiple-input, multiple-output-per-input user-defined function, which represents one embodiment of the present invention, which produces the tuples shown in the CORRESPONDERS relational table shown in FIG. 7. The initial part of the statement contains a set of arguments 802 similar to arguments passed to a scalar PDF, but returns a table 804 in similar fashion to return of a table by a table UDF. Implementation of the multiple-input, multiple-output-per-input UDF includes declaration of a number of local variables 806 and then code that is invoked for each input tuple provided by a query processor selecting tuples from the relational table DATA, as in a scalar UDF 808. When the query processor passes a first tuple to the UDF, certain of the local variables are initialized in block 810. When the query processor passes a second tuple to the UDF, a second set of local variables are initialized in block 812. Each successive tuple then input by the query processor to the UDF is considered in code block 814, in which each successive triplet of rows in the relational table DATA is considered, since each successive tuple input following input of the first two tuples represents a next, different triplet of rows within relational table DATA. When the triplet contains two rows with one or more field values matching one or more field values of last-received row, as discussed above, two double-starred result rows are produced 816. Otherwise, when a field of the last-received tuple matches either of the preceding tuples, then a single single-starred result tuple is produced 818. Otherwise, no result tuple is produced.

While the implementation shown in FIG. 8 would appear to be a logical solution to implementing the above-discussed operation that produces the relational table CORRESPONDERS from the relational table DATA, it cannot be implemented by using either a scalar UDF or a table UDF. This represents an example of the many task domains that cannot be addressed by currently available UDFs due to constraints in UDF invocation patterns. The implementation shown in FIG. 8 would need three, rather than two, memory buffers. A first memory buffer would span all calls in each of which the query processor passes a next input tuple to the UDF. A second memory buffer would be associated with processing of a single input tuple. A third memory buffer would be used for each result row returned for a particular input tuple. The first two of these three memory buffers are used identically in the multiple-input, multiple-output-per-input UDF as the two memory buffers are used by a scalar UDF. The last two of these three memory buffers are used identically as the two memory buffers used by a table UDF. The implementation of the multiple-input, multiple-output-per-input UDF shown in FIG. 8 thus represents a type of hybrid UDF that combines the functionalities of a scalar UDF and a table UDF.

Figure 9:
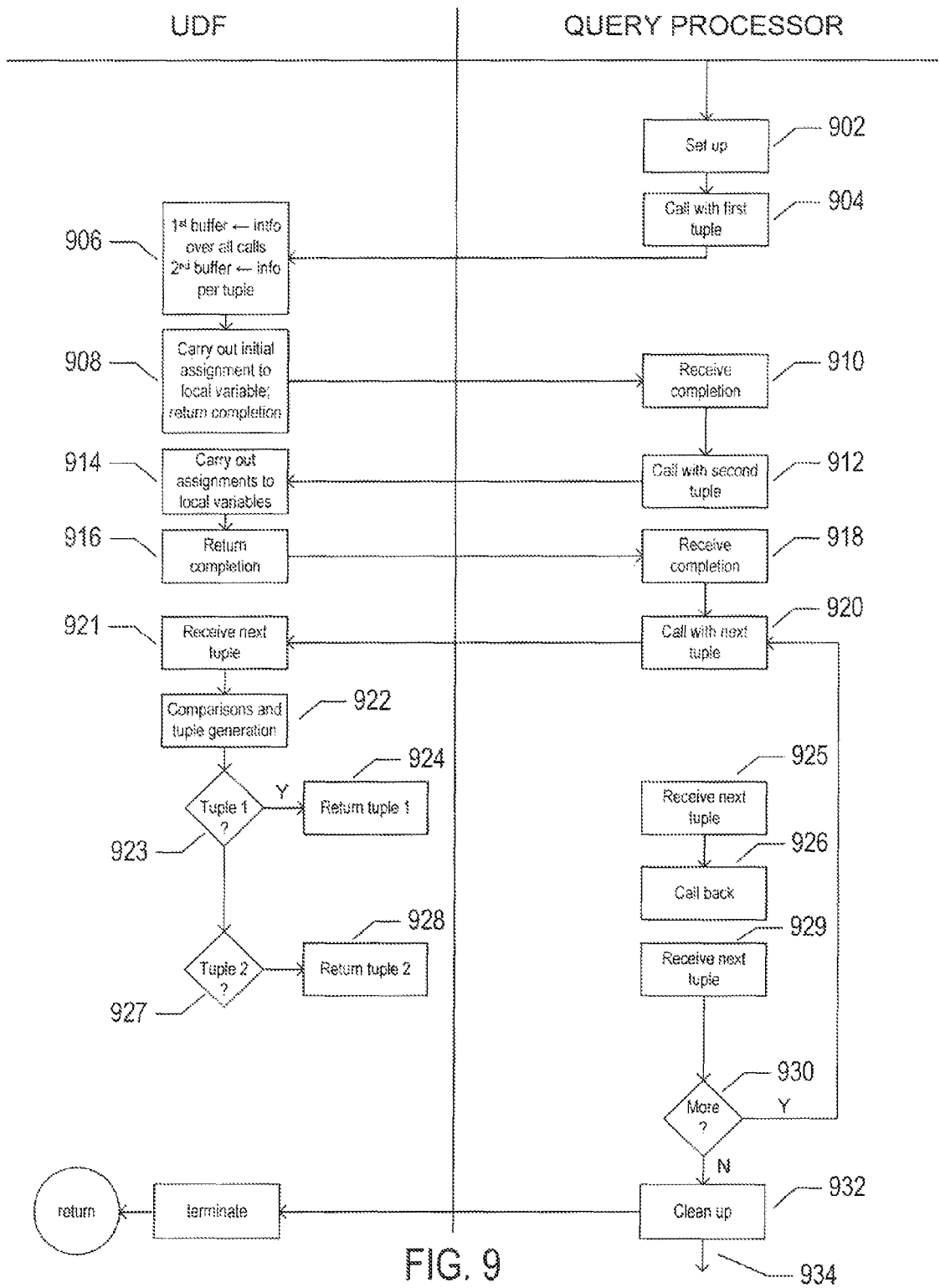
FIG. 9 illustrates a possible implementation of the multiple-input, multiple-output-per-input user-defined function, shown in FIG. 8 that represents one embodiment of the present invention.

FIG. 9 illustrates a possible implementation of the multiple-input, multiple-output-per-input user-defined function, shown in FIG. 8, which represents one embodiment of the present invention. FIG. 9 uses the same illustration conventions as used in FIGS. 6 and 4. In step 902, the query processor reaches a point in processing an SQL statement at which the multiple-input, multiple-output-per-input UDF needs to be invoked, and sets up a framework for interaction with the UDF. In step 904, the query processor calls the UDF, passing to the UDF a first tuple. In step 906, the UDF sets up a first buffer to contain information spanning all subsequent calls in each of which the query processor passes a subsequent input to the UDF. Then, in step 908, the UDF processes the first tuple, in block 810 of FIG. 8, and returns execution control to the query processor, which receives a response from the UDF in step 910 and calls the UDF with the second input tuple in step 912. In step 914, the UDF executes instruction block 812 in FIG. 8 to process the second tuple. Then a completion is returned to the query processor, which receives the completion in step 918. In the loop including steps 920-930, the query processor calls the UDF with each subsequent input tuple, in step 920, which is received by the UDF in step 921 and processed in steps 922-929 according to code block 814 in FIG. 8. No result tuple may be returned for an input, a single result tuple is returned for an input in step 924, or two result tuples are returned for an input in steps 924 and 928. Finally, following input of all tuples from the relational table DATA to the multiple-input, multiple-output-per-input UDF, the query processor, in step 932, sends a termination message to the UDF, deconfigures any of the framework configured in step 902 for interaction with the UDF, and continues with subsequent query processing 934.

Figure 10:
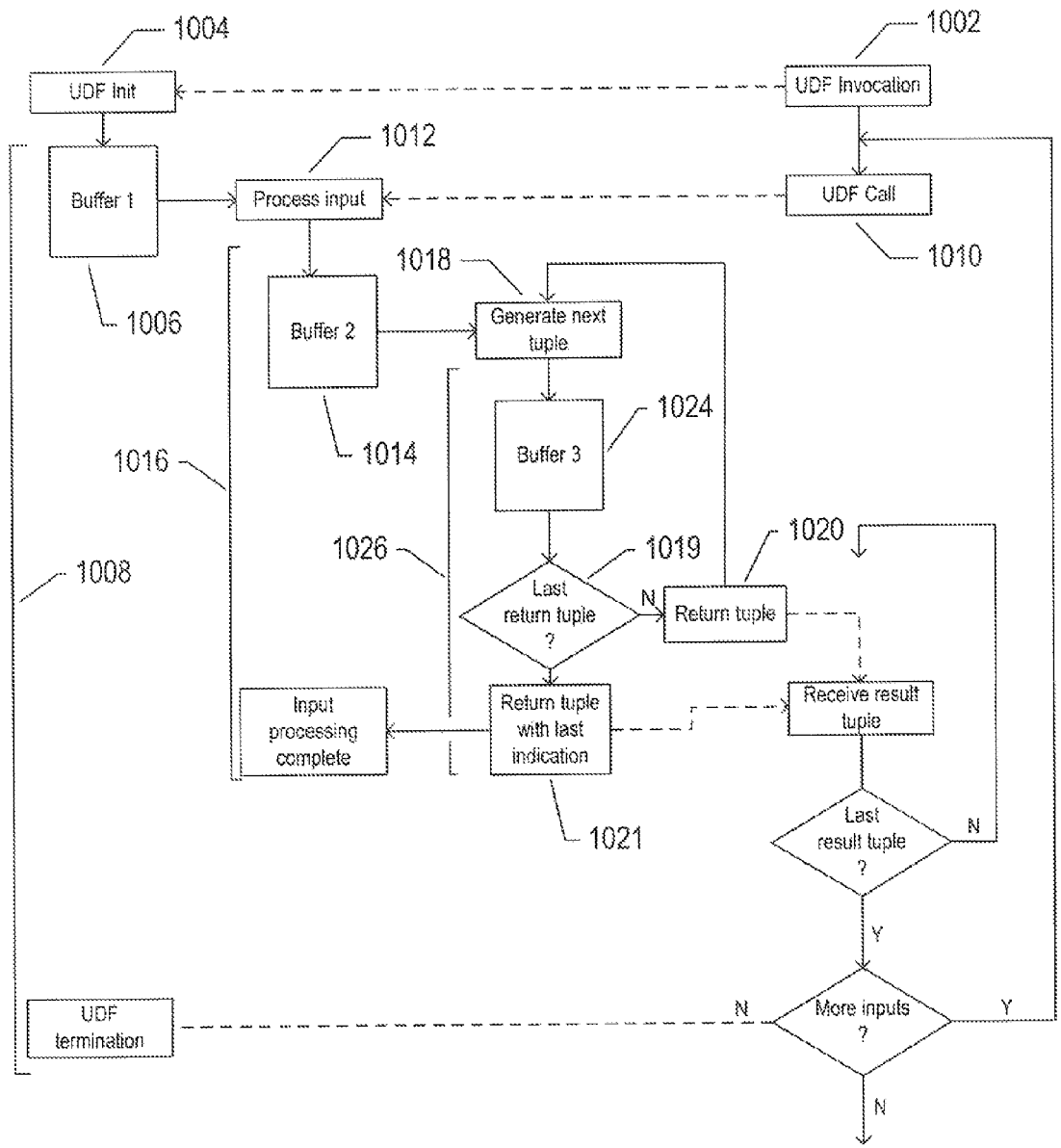
FIG. 10 provides a different, simplified diagram of the multiple-input, multiple-output-per-input user-defined function, discussed above with reference to FIGS. 8 and 9, that represents one embodiment of the present invention.

FIG. 10 provides a different, simplified diagram of the multiple-input, multiple-output-per-input user-defined function, discussed above with reference to FIGS. 8 and 9, that represents one embodiment of the present invention. FIG. 10 emphasizes the roles of the three buffers, discussed above, that are used by the multiple-input, multiple-output-per-input UDF. The UDF is invoked by a call from the query processor 1002 and carries out certain initialization steps 1004, including initializing the contents of the first, highest-level memory buffer 1006 to contain information needed over the entire lifetime of the UDF invocation, as indicated by bracket 1008. The UDF is then called multiple times, in each call receiving input from the query processor in steps 1010 and 1012. For each input-passing call, the UDF maintains the contents of a second memory buffer 1014 to contain that information needed for processing each call made in step 1010. The contents of the second memory buffer span processing of each input-transmitting call, as indicated by bracket 1016. In the processing of each input-transmitting call, the UDF generates potentially multiple outputs in steps 1018-1021. The UDF employs a third buffer 1024 that spans generation of all of the output tuples, as indicated by bracket 1026, generated for a particular input tuple. As discussed above, the first buffer 1006 and second buffer 1014 serve, in the multiple-input, multiple-output-per-input UDF, the same roles as served by the two buffers of a scalar UDF. Buffers 1014 and 1024 serve the same roles in the multiple-input, multiple-output-per-input UDF served by the two buffers used in the implementation of a table UDF.

A multiple-input, multiple-output-per-input UDF represents one embodiment of the present invention. Please note that a multiple-input, multiple-output-per-input UDF is a processor-controlled database operation specified by computer instructions stored in electronic memory that operates within the hardware and data-storage components of a database system. As with any computer-instruction-defined, processor-controlled operation within a computer system, multiple-input, multiple-output-per-input UDFs that represent embodiments of the present invention carry out physical operations on physical machine components including reading data from, writing data to, and storing data within electronic memories and/or mass-storage devices.

Figure 11A:
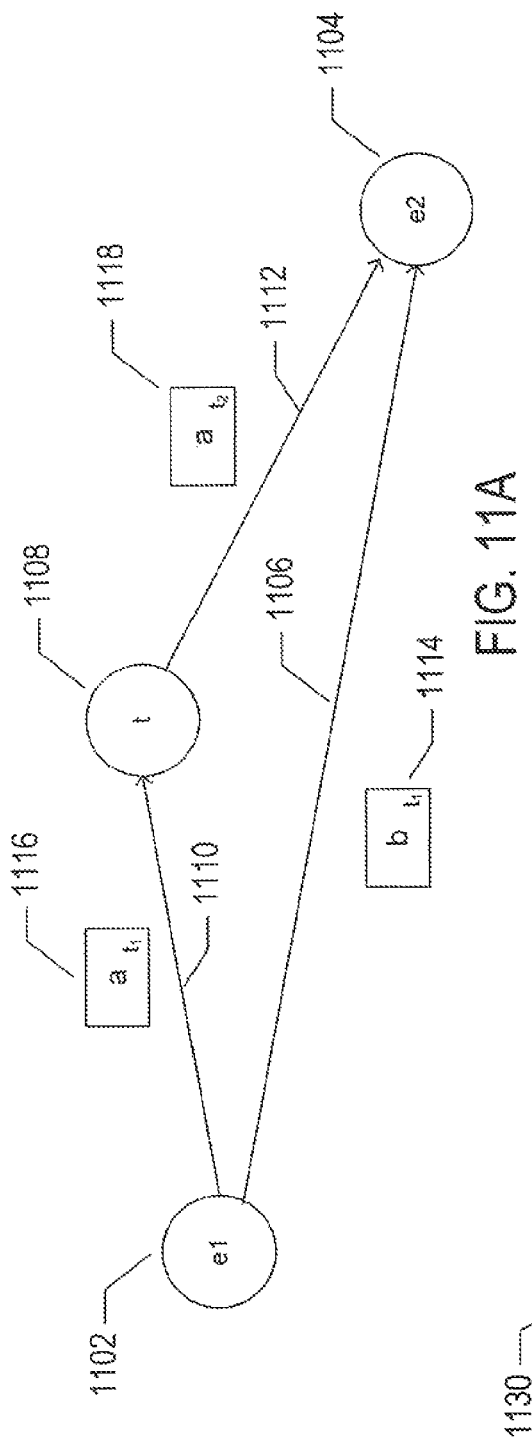
FIGS. 11A-B illustrate an actual task domain that, until the advent of the multiple-input, multiple-output-per-input user-defined function that represents an embodiment of the present invention, could not be addressed using currently available user-defined functions.
Figure 11B:
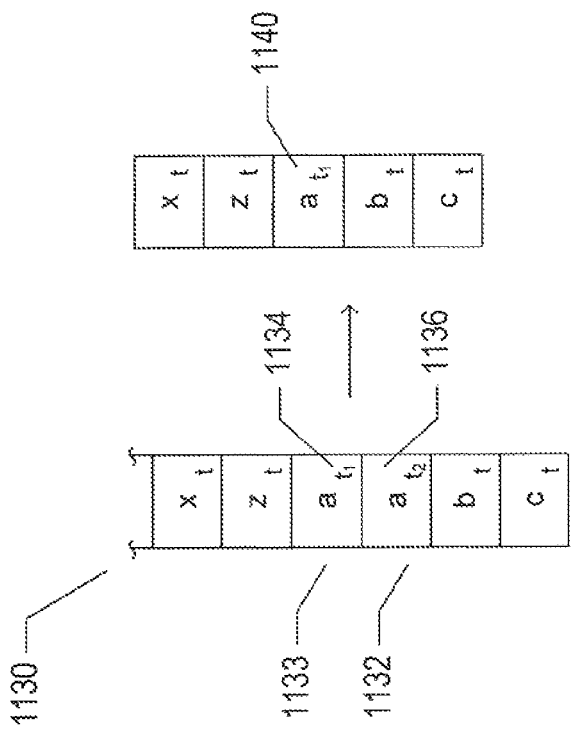

FIGS. 11A-B illustrate an actual task domain that, until the advent of the multiple-input, multiple-output-per-input user-defined function that represents an embodiment of the present invention, could not be addressed using currently available user-defined functions. In FIG. 11A, a simple diagram showing message transfer within a communications network is provided. In this diagram, a first endpoint 1102 sends a message to a second endpoint 1104. The message can be directly sent between end points 1106 or may be sent through one or more intermediaries 1108 via two or more paths or legs 1110 and 1112. The communications system generates a call detail record ("CDR"), such as CDR 1114, for each path, or leg, over which the message is transmitted. A single CDR 1114 is generated for the direct endpoint-to-endpoint path 1106, and two CDRs 1116 and 1118 are generated for the two-leg path 1110 and 1112. These CDRs are inserted into an extremely large relational table. Ultimately, the table needs to be processed so that, when there are two more CDRs entered for a single call, such as the single call from endpoint 1102 to endpoint 1104 that includes legs 1110 and 1112, the multiple CDRs corresponding to a single call are replaced by a single CDR, for purposes of statistical analysis of call patterns, call volumes, accounting, and other purposes. Each CDR contains a number of fields related to the source endpoint, destination endpoint, and other information that characterizes and describes a call as well as one or more time stamps corresponding to the time at which the call or leg is initiated. For simplicity, in FIG. 11A, the contents of the CDR other than a time stamp are indicated by a single lower-case letter, and the time stamps are indicated by small subscripted letter t's. The database can recognize multiple CDRs corresponding to a single call from the fact that the contents of the CDRs are generally equivalent and the time stamps associated with the multiple CDRs fall within a very small time interval $\Delta t$. FIG. 11B shows a tiny portion of a raw CDR table generated during operations of a communications network and a tiny portion of a processed relational table from which each two or more CDRs corresponding to different legs of a single call have been coalesced into a single CDR. The small set of CDRs within an extremely large relational table 1130 shown in FIG. 11B includes two CDRs 1132-1133 which include the same information but are associated with time stamps $t_1$ and $t_2$ 1134 and 1136 that are either identical or differ by a small time difference $\Delta t$. In processing the raw relational table, the database system notes the similar contents of the two CDRs 1132 and 1133 as well as the proximity in time of the two associated time stamps 1134 and 1136 and therefore coalesces the two CDRs into a single CDR 1140 in the processed relational table corresponding to the raw relational table.

The raw-CDR-table processing, described above, can be carried out by a self-join based SQL statement. However, because the raw-CDR table and processed-CDR table are generally extremely large, a self-join would take an enormous amount of time to execute.

Figure 12A:
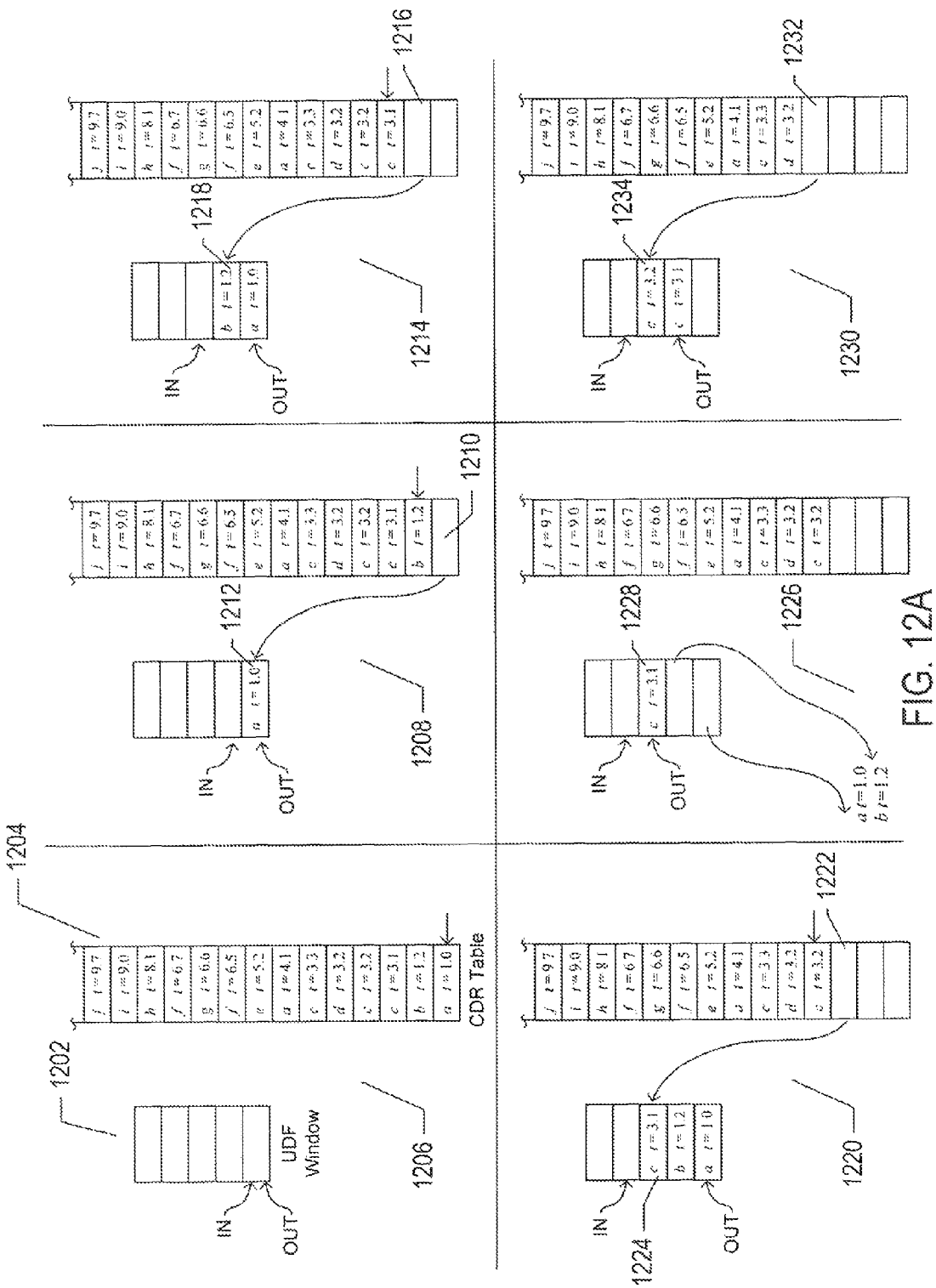
FIGS. 12A-B illustrate a multiple-input, multiple-output-per-input user-defined-function-based solution to the task of processing a raw table of CDRs into a processed table of CDRs, as discussed above with reference to FIG. 11B that represents an embodiment of the present invention.
Figure 12B:
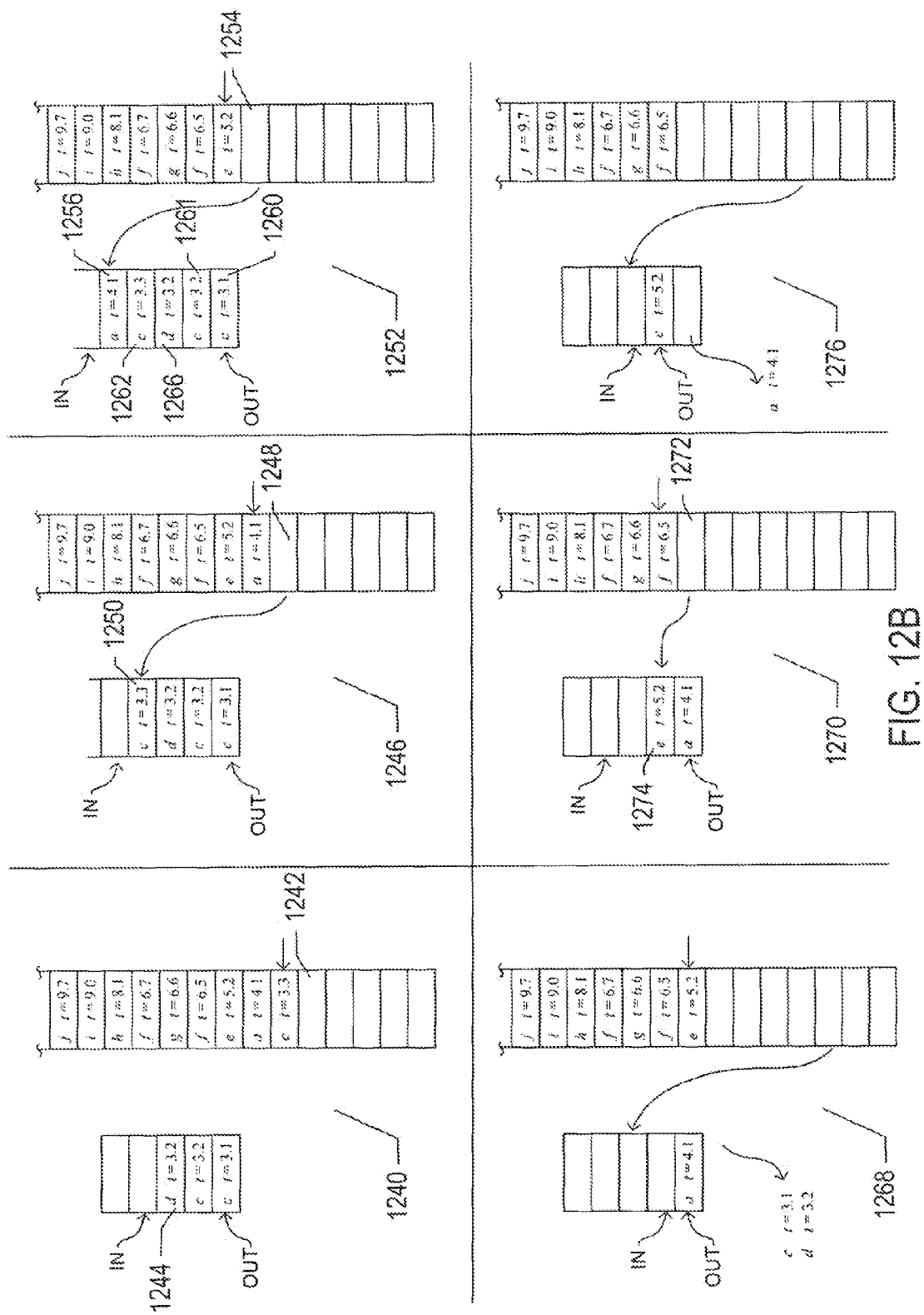

FIGS. 12A-B illustrate a multiple-input, multiple-output-per-input user-defined-function-based solution to the task of processing a raw table of CDRs into a processed table of CDRs, as discussed above with reference to FIG. 11B that represents an embodiment of the present invention. This multiple-input, multiple-output-per-input user-defined-function-based solution is similar to the multiple-input, multiple-output-per-input user-defined-function-based operation discussed above with reference to FIG. 8. In FIGS. 12A-B, a sequence of panels is shown, each panel representing a different point in time during execution of the multiple-input, multiple-output-per-input UDF that addresses the CDR-table-processing task discussed above with reference to FIG. 11B. The UDF maintains a window 1202 of tuples extracted from the raw CDR table by a query processor and furnished to the UDF. The query processor extracts one tuple at a time from the CDR table and passes it to the UDF. In response, the UDF produces either no output, a single tuple output, or multiple tuple outputs. These outputs are generally the rows of the processed-CDR table.

In the example shown in FIGS. 12A-B, the initial 14 entries in a raw CDR relational table 1204 are shown, using the illustration conventions used in FIGS. 11A-B. In panel 1206, the UDF has yet to be passed a row by the query processor, the UDF window 1202 is empty, and no rows have been removed from the raw CDR table. In panel 1208, the query processor removes the first entry from the CDR table 1210 and passes it to the UDF, which enters it into the first slot of the UDF window 1212. No output is returned by the UDF, since there is no basis yet for detecting redundant CDRs. In panel 1214, a second entry 1216 is removed from the CDR table and passed, by the query processor, to the UDF, which enters the second query in the second slot of the UDF window 1218. Again, no output is returned by the UDF, because the $\Delta t$ between the first two entries in the UDF window is 0.2, the maximum allowable $\Delta t$. In panel 1220, a third entry 1222 is removed from the CDR table by the query processor and passed to the UDF, which enters the third entry into the third slot of the UDF window 1224. At this point, there is a $\Delta t$ over the entries in the UDF window of $3.1-1.0=2.1$. In the example shown in FIGS. 12A-B, the total $\Delta t$ over which duplicate CDRs are recognized is 0.2. Thus, at this point in time, if no duplicate entries have been detected for the first three entries, the first two entries in the UDF window can be returned, as shown in panel 1226, with the final entry 1228 retained for comparison with subsequent entries. In panel 1230, yet another entry is removed from the CDR table 1232 by the query processor and passed to the UDF, which enters this entry in a next slot in the UDF window 1234. The $\Delta t$ over the entries in the UDF window is $3.2-3.1=0.1$, so no entries need to be removed from the UDF window and returned by the UDF. Moving to FIG. 12B, in panel 1240, yet all additional entry 1242 is moved from the CDR table to the UDF by the query processor and entered into the UDF window by the UDF 1244. Again, the total $\Delta t$ over the entries in the UDF window is 0.2, which is the maximum allowed $\Delta t$ for the UDF window. Therefore, no additional processing occurs. In panel 1246, when the query processor removes yet a next CDR table entry 1248 and transmits it to the UDF, which enters the entry in the fourth slot of the UDF window 1250, the $\Delta t$ is $3.3-3.1=0.2$, still within the maximum allowable $\Delta t$ window. In panel 1252, the query processor removes yet an additional entry 1254 from the CDR table and transmits the entry to the UDF, which places the entry in a fifth slot 1256 in the UDF window. At this point, the $\Delta t$ over the UDF window is $4.1-3.1=1.0$, greater than the maximum $\Delta t$. Therefore, the UDF processes the UDF window, looking for duplicate entries. In this case entries 1260-1262 all contain similar information and are associated with time stamps within the interval $\Delta t=0.2$, and therefore are coalesced into a single output CDR that contains the earliest time stamp of the three entries. In addition, the time difference between the last entry $t=4.1$ and the second-to-last entry $t=3.3=0.8$ which is greater than the maximum $\Delta t$, so all but the final entry in the UDF window are removed by the UDF, with the unique coalesced CDR corresponding to entries 1260-1262 and the CDR present in the third slot of the UDF window 1266 returned by the UDF in panel 1268. In panel 1270, yet another entry is removed from the CDR table 1272 and passed by the query processor to the UDF, which enters the next entry in the second slot 1274 of the UDF window. At this point, the Δt over the UDF window is 5.2−4.1=1.1 which is greater than the maximum Δt for the UDF window. As a result, in panel 1276, the first entry in the UDF window is removed and returned.

Thus, a multiple-input, multiple-output-per-input UDF can be used to implement a sliding-window mechanism for detecting and coalescing multiple CDRs corresponding to a single call. As mentioned above, this sliding-window mechanism is very similar to the multiple-input, multiple-output-per-input UDF implemented in the code shown in FIG. 8 and as described in FIG. 9. Unlike the multiple-input, multiple-output-per-input UDF implemented in the code shown in FIG. 8 and as described in FIG. 9, the multiple-input, multiple-output-per-input UDF for processing raw-CDR tables may return more than two output tuples upon receiving a next input tuple.

An actual example of the self-join-based SQL statements for raw-CDR-table processing is next provided:

```
CREATE TEMP VIEW Merged_CDRs AS SELECT
    DISTINCT a.NPA_o, a.NXX_o, a.LINE_o, a.NPA_d, a.NXX_d, a.LINE_d,
a.t1, a.t2 FROM CDRs a, CDRs b
    WHERE a.NPA_o = b.NPA_o AND a.NXX_o = b.NXX_o AND
    a.LINE_o = b.LINE_o
        AND a.NPA_d = b.NPA_d AND a.NXX_d = b.NXX_d AND
        a.LINE_d = b.LINE_d
        AND a.t1 > b.t1 AND a.t1 − b.t1 < 0.2
SELECT a.NPA_o, a.NXX_o, a.LINE_o, a.NPA_d, a.NXX_d, a.LINE_d,
a.t1, a.t2 FROM Merged_CDRs a
    WHERE a.t1 = (SELECT MAX(p.t1) FROM Merged_CDRs p
        WHERE a.NPA_o = b.NPA_o AND a.NXX_o = b.NXX_o AND
        a.LINE_o = b.LINE_o
            AND a.NPA_d = b.NPA_d AND a.NXX_d = b.NXX_d AND
            a.LINE_d = b.LINE_d)
    UNION
    SELECT a.NPA_o, a.NXX_o, a.LINE_o, a.NPA_d, a.NXX_d, a.LINE_d, a.t1,
a.t2 FROM CDRs a
        WHERE NOT EXIST (SELECT · FROM CDRs b
            WHERE a.NPA_o = b.NPA_o AND a.NXX_o = b.NXX_o AND
            a.LINE_o = b.LINE_o
                AND a.NPA_d = b.NPA_d AND a.NXX_d = b.NXX_d AND
                a.LINE_d = b.LINE_d
                AND ((b.t1 > a.t1 AND b.t1 − a.t1 < 0.2) OR (b.t1 > a.t1
                AND b.t1 − a.t1 <
0.2)))
```

For comparison, an SQL statement for raw-CDR-table processing that employs the above-described sliding-window the multiple-input, multiple-output-per-input UDF follows:

```
SELECT (t) · FROM
    (SELECT correlate_cdrs(NPA_o, NXX_o, LINE_o, NPA_d, NXX_d, LINE_d,
OPC, TPC, DPC, t_1, t_2, 0.2)
        AS t FROM (SELECT · FROM CDRs ORDER BY t1) s) r;
```

In one experiment, the time used to process raw-CDR table of three different sizes by the sell-join-based query, Q1, and the multiple-input, multiple-output-per-input Q2, is provided in the following table:

| # of CDRs | 1M | 50M | 100M |
|---|---|---|---|
| Q1 | 5.05 seconds | 3.37 hours | 12.45 hours |
| Q2 | 6.54 seconds | 362.58 seconds | 798.32 second |

Although the present invention has been described in terms of particular embodiments, it is not intended that the invention be limited to these embodiments. Modifications will be apparent to those skilled in the art. For example, multiple-input, multiple-output-per-input UDFs can be implemented in a variety of different ways on many different types of hardware platforms by varying any of many familiar implementation parameters, including programming language, control structures, data structures, modular organization, and other such implementation parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A database management system comprising:
   at least one processor and electronic memory;
   a database-query processor to make multiple calls to a multiple-input, multiple-output-per-input user-defined-function;
   the multiple-input, multiple-output-per-input user-defined-function to, in response to an invocation:
      set up a first memory buffer to maintain first input information for a first period equal to a lifetime of the invocation, wherein the first input information is provided to the multiple-input, multiple-output-per-input user-defined-function;
      set up a second memory buffer to maintain second input information for a second period, wherein the second input information is provided to the multiple-input, multiple-output-per-input user-defined-function; and
      set up a third memory buffer to maintain output information for a third period, wherein the output information is provided by the multiple-input, multiple-output-per-input user-defined-function.

2. The database management system of claim 1 wherein the database-query processor is to receive multiple outputs from the multiple-output-per-input user-defined-function in response to transmitting an input to the multiple-output-per-input user-defined-function by calling the multiple-input, multiple-output-per-input user-defined-function two or more times to receive, as a result of each call, a next output of the multiple outputs.

3. The database management system of claim 2 wherein the multiple-output-per-input user-defined-function is to implement processing of a call-detail-record table by which multiple call detail records corresponding to a single call within the call-detail-record table are replaced by a single call detail record.

4. The database management system of claim 3 wherein the multiple-output-per-input user-defined-function identifies the multiple call detail records corresponding to the single call as two or more call detail records containing equivalent information describing the single call and having time stamps with values that fall within a time window corresponding to time interval.

5. The database management system of claim 4 wherein the multiple-output-per-input user-defined-function maintains a window of call detail records extracted from the call-detail-record table, each call detail record of the window to be input to the multiple-output-per-input user-defined-function in a single input-transmitting call.

6. The database management system of claim 5 wherein the multiple-output-per-input user-defined-function outputs, in response to receiving each call-detail-record-table input by an input-transmitting call, multiple call detail records of the processed call-detail-record table, wherein the multiple call detail records are to be replaced with a single call detail record.

7. The database management system of claim 1 wherein the first input information stored in the first memory buffer includes one or more arguments passed to the multiple-input, multiple-output-per-input user-defined-function when the multiple-input, multiple-output-per-input user-defined-function is invoked.

8. The database management system of claim 1 wherein the second input information stored in the second memory buffer includes data passed to the multiple-input, multiple-output-per-input user-defined-function in a received input-transmitting call.

9. The database management system of claim 1 wherein the third memory buffer is to store output tuples generated for a particular input.

10. The database management system of claim 1, wherein the output information stored in the third memory buffer includes data returned by the multiple-input, multiple-output-per-input user-defined-function in response to receiving a input-transmitting call.

11. The database management system of claim 1, wherein the multiple-output-per-input user-defined-function is further to compute and return, to the database-query processor, multiple outputs in response to at least one of the multiple inputs.

12. The database management system of claim 1, wherein the second period is equal to a lifetime of each of the multiple calls to the multiple-input, multiple-output-per-input user-defined-function, and the third period is equal to a lifetime of generating output tuples for a particular input.

13. A method carried out by a database management system that includes at least one processor and an electronic memory and a database-query processor, executed on a computer processor controlled by computer instructions stored in a computer-readable memory, to provide a multiple-input, multiple-output-per-input user-defined function by:
  initializing the multiple-input, multiple-output-per-input user-defined function following an invocation of the multiple-input, multiple-output-per-input user-defined function by the database-query processor;
  in response to the invocation of the multiple-input, multiple-output-per-input user-defined function:
    setting up a first memory buffer to maintain first input information for a lifetime of the invocation, wherein the first input information is provided to the multiple-input, multiple-output-per-input user-defined-function;
    setting up a second memory buffer to maintain second input information for a lifetime of each one of multiple calls to the multiple-input, multiple-output-per-input user-defined-function, wherein the second input information is provided to the multiple-input, multiple-output-per-input user-defined-function; and
    setting up a third memory buffer to maintain output information for a lifetime of generating output tuples for a particular input, wherein the output information is provided by the multiple-input, multiple-output-per-input user-defined-function.

14. The method of claim 13 wherein the database-query processor is to receive multiple outputs from the multiple-output-per-input user-defined-function in response to transmitting an input to the multiple-output-per-input user-defined-function by subsequently calling the multiple-input, multiple-output-per-input user-defined-function two or more times to receive, as a result of each subsequent call, a next output of the multiple outputs.

15. The method of claim 14, the first input information stored in the first memory buffer including one or more arguments passed to the multiple-input, multiple-output-per-input user-defined-function when the multiple-input, multiple-output-per-input user-defined-function is invoked.

16. The method of claim 14, the second input information stored in the second memory buffer including data passed to the multiple-input, multiple-output-per-input user-defined-function in a received input-transmitting call.

17. The method of claim 14, the output information stored in the third memory buffer including data returned by the multiple-input, multiple-output-per-input user-defined-function in response to receiving a input-transmitting call.

18. A method, carried out by a database management system that includes at least one processor and an electronic memory and a database-query processor, to process a call-detail-record table to replace multiple call detail records corresponding to a single call within the call-detail-record table by a single call detail record, the method comprising:
  initializing a multiple-input, multiple-output-per-input user-defined function following an invocation of the multiple-input, multiple-output-per-input user-defined function by the database-query processor;
  in response to the invocation of the multiple-input, multiple-output-per-input user-defined function:
    setting up a first memory buffer to maintain first input information for a first period equal to a lifetime of the invocation, wherein the first input information is provided to the multiple-input, multiple-output-per-input user-defined-function;
    setting up a second memory buffer to maintain second input information for a second period, wherein the second input information is provided to the multiple-input, multiple-output-per-input user-defined-function; and
    setting up a third memory buffer to maintain output information for a third period, wherein the output information is provided by the multiple-input, multiple-output-per-input user-defined-function.

19. The method of claim 18 wherein the multiple-output-per-input user-defined-function identifies multiple call detail records within the call-detail-record table corresponding to a single call as two or more call detail records containing equivalent information describing the single call and having time stamps with values that fall within a time window corresponding to a time interval.

20. The method of claim 18,
  wherein the multiple-output-per-input user-defined-function maintains a window of call detail records extracted from the call-detail-record table, each call detail record input to the multiple-output-per-input user-defined-function in a single input-transmitting call; and
  wherein the multiple-output-per-input user-defined-function outputs, in response to receiving each call-detail-record-table input by an input-transmitting call, multiple call detail records of the processed call-detail-record table in which multiple call detail records identified as corresponding to a single call are replaced with a single call detail record for each call.

* * * * *